P. NOGUIER.
CITY STREET DIRECTORY.
APPLICATION FILED DEC. 29, 1909.
963,635.
Patented July 5, 1910.
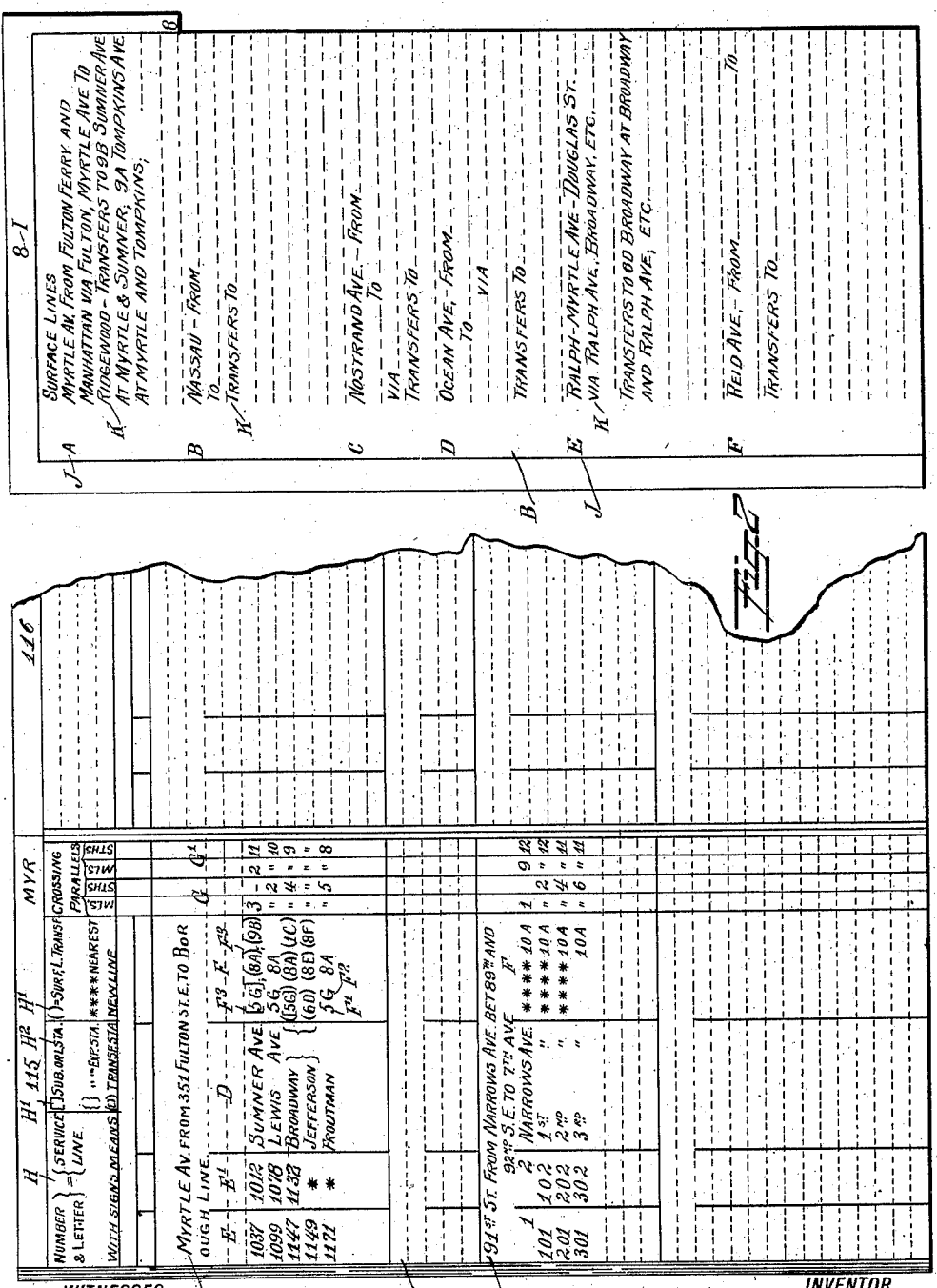

UNITED STATES PATENT OFFICE.

PAUL NOGUIER, OF NEW YORK, N. Y., ASSIGNOR OF ONE-HALF TO CHARLES ANDRO, OF NEW YORK, N. Y.

CITY STREET-DIRECTORY.

963,635.  Specification of Letters Patent. Patented July 5, 1910.

Application filed December 29, 1909. Serial No. 535,493.

*To all whom it may concern:*

Be it known that I, PAUL NOGUIER, a citizen of France, and a resident of the city of New York, borough of Brooklyn, in the county of Kings and State of New York, have invented a new and Improved City Street-Directory, of which the following is a full, clear, and exact description.

The object of the invention is to provide a new and improved city street directory, arranged to enable the user to readily locate desired points at any one of the streets, avenues and the like, to obtain all the desired information as to transportation lines, such as elevated railroads, surface street cars, subways, etc., at or near any given point or the nearest station thereto, and also to obtain distances between points. For the purpose mentioned, use is made of a book made up of two sets of pages, of which one set of pages forms an index and is provided with page numbers, arbitrary characters and transportation information indicated by the said arbitrary characters, each of the pages of the other set of pages bearing the name of a street, a column giving the names of the intersecting streets and a column containing numerical designations of the pages of the index associated with an arbitrary character corresponding to the arbitrary characters heading the information on the corresponding index page.

A practical embodiment of the invention is represented in the accompanying drawings forming a part of this specification, in which similar characters of reference indicate corresponding parts in both views.

Figure 1 is a face view of the book open at a page; and Fig. 2 is an index page of the book showing the detail information relative to transportation.

The city street directory is preferably in the form of a book made up of two sets of pages A and B, of which the pages A (see Fig. 1) contain full information as to each street, avenue or other highway, byway or place of the city, while the other set of pages B (Fig. 2) forms an index containing detail information as to transportation. Each of the pages A bears the name C of a street, avenue or other highway, byway or place of the city and also the terminals of the said street: for instance, "Myrtle avenue from 351 Fulton st. east to borough line". Below the name C is arranged a column D, containing the names of the streets intersecting Myrtle avenue, and to the left of this column D are arranged two columns E and E' giving the house numbers at the corners of Myrtle avenue with the intersecting streets indicated in the column D. In case a street does not cross another street, then a mark, such as a star, indicates the fact, thus, as shown in Fig. 1, Jefferson and Troutman streets do not cross Myrtle avenue, but begin or terminate at Myrtle avenue. To the right of the column D is a column F containing numerals F', arbitrary characters $F^2$ and signs $F^3$, and to the right of the column F are two columns G and G' indicating miles and subdivisions, calculated according to predetermined lines laid out on a map of the city, the said miles and subdivisions of the columns G and G' being opposite the names of the streets in the column D and the marking in the column F. It is understood that the miles and subdivisions are derived from the usual quadrangle plotting of a city map, the subdivisions being preferably given in sixteenths of a mile, on the basis of sixteen city blocks to the mile.

The page A is preferably provided with a heading H, containing signs H' corresponding to the signs $F^3$ and explanations $H^2$ of the said signs: thus, for instance, the sign H' [ ] refers to a subway or elevated railroad station, while the sign H' ( ) refers to surface and elevated railroad transfers, and so on.

Each of the leaves B is provided with a page numeral I and with arbitrary characters J corresponding to the arbitrary characters $F^2$ in the column F of a page A. Each of the arbitrary characters J heads a legend K giving detail information as to transportation for a corresponding crossing street given in the columns D and F. For instance, in the column F in alinement with Sumner avenue is found (8A), of which the numeral 8 refers to the corresponding page number I on the leaf B, shown in Fig. 2, while the arbitrary character, the letter A, refers to the arbitrary character J on this page 8 of the index leaf B, thus giving the information that Sumner avenue can be reached by way of Myrtle avenue from Fulton Ferry and Manhattan, via Fulton, Myrtle avenue to Ridgewood; transfers to 9B Sumner ave. at Myrtle avenue and Sumner;

9A Tompkins avenue at Myrtle and Tompkins, etc. It is understood that the 9B and the 9A found in the legend K, just mentioned, refer to page 9 of the index under the headings B and A for additional information. The brackets F³ in the column F, inclosing the 8A previously mentioned, correspond to the parentheses H' ( ), which means surface and elevated transfers are given at Sumner avenue at the crossing with Myrtle avenue.

It is understood that the numerals F', the arbitrary characters F² and the signs F³ are combined to enable the user of the book to quickly obtain the desired information, and the said numerals, characters and signs are correspondingly combined or used individually; thus brackets [ ] around a numeral F' indicate a station of the elevated railroad or subway lines which the numeral represents, and parentheses and brackets ([ ]) around a numeral F' indicate a station at which a passenger on the elevated railroad can change to another elevated railroad, surface or subway line for the same fare. Parentheses ( ) around a number indicate that the line represented by such a number transfers to another at the crossing indicated. Four stars indicate that no surface line runs over the place named, but the nearest line is represented by the number or numbers following, as indicated in the lower portion of Fig. 1 relative to the matter in the column F pertaining to 91st st.

It is understood that I do not limit myself to the particular form of the signs employed, as the same can be readily varied without deviating from my invention.

Having thus described my invention, I claim as new and desire to secure by Letters Patent:

1. A city street directory, comprising a book made up of two sets of pages, of which one set of pages forms an index and is provided with page numbers, arbitrary characters and transportation information headed by the said arbitrary characters, each of the pages of the other set of pages bearing the name of a street, a column giving the names of the intersecting streets, and a column containing numerical designations of the pages of the index associated with an arbitrary character corresponding to the arbitrary characters heading the information on the corresponding index page.

2. A city street directory, comprising a book made up of two sets of pages, of which one set of pages forms an index and is provided with page numbers, arbitrary characters and transportation information headed by the said arbitrary characters, each of the pages of the other set of pages bearing the name of a street, a column giving the names of the intersecting streets, and a column containing numerical designations of the pages of the index associated with an arbitrary character corresponding to the arbitrary characters heading the information on the corresponding index page, and signs inclosing the said page number and its arbitrary character.

3. A city street directory, comprising a book made up of two sets of pages, of which one set of pages forms an index and is provided with page numbers, arbitrary characters and transportation information headed by the said arbitrary characters, each of the pages of the other set of pages bearing the name of a street, a column giving the names of the intersecting streets, and a column containing numerical designations of the pages of the index associated with an arbitrary character corresponding to the arbitrary characters heading the information on the corresponding index page, and a distance guide indicating the distances in miles and subdivisions, and calculated according to predetermined lines laid out on a map of the city.

In testimony whereof I have signed my name to this specification in the presence of two subscribing witnesses.

PAUL NOGUIER.

Witnesses:
 THEO. G. HOSTER,
 PHILIP D. ROLLHAUS.